United States Patent [19]
Raby

[11] Patent Number: 5,663,771
[45] Date of Patent: Sep. 2, 1997

[54] ADAPTIVE VIDEO COMB FILTER WITH LEGALIZED OUTPUT SIGNALS

[75] Inventor: Dean L. Raby, San Diego, Calif.

[73] Assignee: Raytheon Company, Lexington, Mass.

[21] Appl. No.: 664,032

[22] Filed: Jun. 13, 1996

[51] Int. Cl.$^6$ ........................................... H04N 9/78
[52] U.S. Cl. .................... 348/663; 348/667; 348/668
[58] Field of Search ................................ 348/663, 665, 348/667, 668; 358/31; H04N 9/78

[56] References Cited

U.S. PATENT DOCUMENTS

| | | | |
|---|---|---|---|
| 4,961,108 | 10/1990 | Perlman | 348/668 |
| 4,994,906 | 2/1991 | Moriwake | 348/668 |
| 5,155,582 | 10/1992 | Tokoi | 348/663 |
| 5,424,784 | 6/1995 | Raby | 348/668 |
| 5,548,342 | 8/1996 | Ikeda | 348/668 |

*Primary Examiner*—Sherrie Hsia
*Attorney, Agent, or Firm*—Donald F. Mofford; Glenn H. Lenzen, Jr.

[57] ABSTRACT

A video comb filter for PAL or NTSC TV standards separates luminance and chrominance signals from a composite video signal by adaptively selecting between at least two different filtering processes, depending on whether the chroma output of the processes is "legal" (is within certain limits) in terms of both magnitude and phase. The present comb filter has a two horizontal scan line delay, and is such that the magnitude and phase of a chrominance signal output from the filter never exceeds that of a single band pass filtered version of the composite video and subsequently does not invert the phase of the luminance signal. The chrominance output signal characteristic is similar to that a four scan line filter; however, because the present filter only uses two lines of delay, any vertical cross luminance occurs across only two scan lines and the diagonal luminance resolution is significantly improved. The output of the comb filter is "legal" (within the RGB color cube) at all times.

22 Claims, 7 Drawing Sheets

FIG. 1
PRIOR ART

DEGREES CHANGE PER LINE PERIOD

ADAPTIVE VIDEO COMB FILTER WITH LEGALIZED OUTPUT SIGNALS

BACKGROUND OF THE INVENTION

1. Field of the Invention

This invention relates to a method and apparatus for separating chrominance and luminance information from a quadrature modulated composite color video signal, and more specifically application of adaptive comb filtering to a composite video color signal to improve separation of chrominance and luminance video signal components during transition states, while maintaining a "legalized" comb filter output.

2. Description of the Prior Art

Comb filtering of video signals is known; see Raby U.S. Pat. No. 5,424,784, ("Raby") incorporated herein by reference in its entirety. Composite color video signals include a brightness (luminance or Y) signal and a color subcarrier signal which is modulated in phase and amplitude to represent hue and saturation of the picture. The subcarrier signal is demodulated to produce color difference signals R-Y, B-Y, and G-Y which are combined with the Y signal for reproduction of red, blue, and green signal information. Simple filters are known to separate the chrominance (chroma) and luminance (luma) from the composite video signal in e.g. television receivers. A video comb filter performs this separation of the luma and chroma signals from the composite video wherein the luma and chroma signals have the same frequency, by using the phase relationship of the chroma signal across multiples of the horizontal scan rate (across several horizontal scan lines).

The two predominant television standards are PAL and NTSC. In PAL TV the chroma vector in a flat field of color advances by 270° per line. Therefore it is known that using a straightforward comb filter architecture, the composite signal from lines which are two horizontal scan lines apart are added to cancel out the chroma vector and produce an average luma signal which can be subtracted from the middle (intervening) horizontal scan line to produce the chroma signal. In NTSC TV, the chroma vector in a flat field of color advances by 180° per line. Therefore it is known to add the composite signals from two consecutive horizontal scan lines to produce an average luma signal (the chroma signal having been canceled out) which can be subtracted from one or the other of the horizontal scan lines to produce the chroma signal.

Therefore with a flat field of color, i.e. having no major picture (hue or brightness) transitions, in both PAL and NTSC TV complete separation of the luma and chroma signals is possible. No cross color (luma processed as color) or cross luma (chroma processed as luma) artifacts are present. However, it is also known that when spatial or temporal discontinuities in the picture occur, the comb filter fails, resulting in undesirable comb filter artifacts in the output picture. The most visually objectionable comb filter artifacts appear in the high frequency portion of the composite video signal, because the magnitude and phase of the high frequency signal has been modified by the discontinuity (transition) in the picture content. These changes in both magnitude and phase in the color output signal can produce color difference components that are outside the so-called RGB color cube ("illegal"), making it virtually impossible to process the decoded information and to re-encode it back into a composite signal without a noticeable loss of vertical picture content.

This process of decoding and encoding is typically undertaken for purposes of (digital) processing of the components (luma and color difference signal) of the composite signal. Such digital processing is performed in certain types of television receivers, other video processing apparatus, and in studio broadcast equipment.

In the above-mentioned simple filters, the composite video is typically fed to a low pass filter to provide the luma and to a bandpass filter centered around the subcarrier frequency to provide the chroma. In addition to other disadvantages, such simple filters are deficient in completely separating chroma and luma components. For example, in order to separate the subcarrier signal for adjusting its amplitude for color intensity control or for demodulation, it is desirable to select only the subcarrier and its sidebands without also including high frequency brightness components. Conversely, the full range brightness (Y) signal will include the color subcarrier, even if the Y range is limited, since in for instance NTSC TV the subcarrier modulation may extend below 3.58 MHz by over 1 MHz. Simply stated, there is some high frequency luma (or cross color) that appears in the spectrum of the chroma, and there is some high frequency chroma (or cross luma) that appears in the spectrum of the luma.

Thus simple filters cannot completely separate composite video into chroma and luma. The appearance of either the Y signal in the chroma or the chroma in the Y signal produces undesirable patterns and distortion of the reproduced television picture. The simple filter approach does have advantages in that the low frequency luma signal is always the correct magnitude and phase while the bandpass high frequency signal, whether luma or chroma, is likewise always the correct magnitude and phase. This ensures that if the decoded picture is subsequently encoded back into a composite video signal the resulting waveform does not contain any "illegal" colors or transitions.

A comb filter removes the cross luma from the chroma signal and the cross color from the luma signal while maintaining as much as the chroma and luma bandwidth as possible. Unlike a simple one dimensional band split filter, in "flat" areas of the picture, i.e. areas in which there are no temporal or spatial changes in the picture, two dimensional comb filters can provide perfect separation of luma and chroma signals without any loss of bandwidth or cross luma or cross color artifacts.

However it is well known that in any comb filter architecture, whether adaptive or nonadaptive (an adaptive comb filter is described in Raby), whenever the comb filter fails to separate the chroma signal from the composite signal due to spatial or temporal transitions in the picture, the magnitude and phase of the resulting luma and chroma cannot be guaranteed. When this occurs, the luma and chroma signals can generate the so-called illegal luma or demodulated color difference signals that translate into the RGB components being outside the legal RGB color cube.

Legalization (correction) of the comb filter output removes the need for clipping or color correcting the color difference signals. This minimizes any illegal colors or transitions in the composite video signal which is subsequently re-encoded from the component signals produced by the decoding process.

Figure 1:
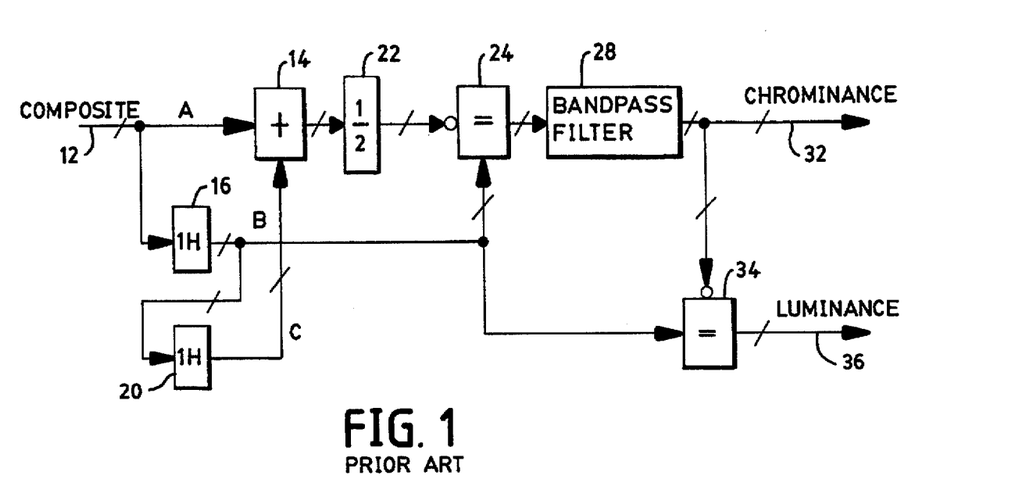
FIG. 1 shows a prior art two line comb filter.

Two non-adaptive comb filter architectures illustrate the concept of legalization of comb filter output. FIG. 1 shows a block diagram of a two horizontal scan line delay comb filter, which separates luma and chrominance without using a PAL modifier and is suitable for PAL TV. As is well known, in a PAL modifier one can cause a one line change in the quadrature modulated chroma signal if one multiplies a given chroma signal by a sine wave at twice the subcarrier frequency of one of the quadrature components.

This comb filter averages the composite video signal across two horizontal scan line delays (i.e., using three scan lines) to cancel the chroma as described above, then subtracts the resulting luma signal from the composite video to obtain chroma. The chroma signal is band limited (bandpass filtered) and subtracted from the center tap of the comb filter to provide the luma signal. Hence as shown in FIG. 1 a digital or analog composite video signal is input at terminal 12. It is to be understood that terminal 12 (as shown) for a digital composite video signal is a bus, e.g. of 8 to 12 bits, as are the other lines shown in FIG. 1 for the digital video version. Input terminal 12 is connected to the input terminal of both adder 14 and a one horizontal scan line store (delay) 16. Line store 16 stores a pixel for a duration of one video line and conventionally includes e.g. a set of series-connected registers. The output terminal of line store 16 is connected to the input terminal of a second line store 20. The output terminal of the second line store 20 connects to the second input terminal of adder 14. Hence adder 14 adds (where three consecutive horizontal scan lines are designated A, B, and C) a pixel of line A to a pixel of line C thus canceling the chroma and providing an average luma signal across three scan lines. (It is understood that due to line stores 16, 20, all three pixels A, B, C are vertically adjacent in the picture.) The output of adder 14 is multiplied by ½ by multiplier 22 to average the pixels of lines A and C at the output terminal of multiplier 22. Subtractor 24 then subtracts this averaged luma value from the pixel of the center line B provided from the output terminal of line store 16.

The output signal from subtractor 24 is then bandpass filtered by bandpass filter 28 and the output signal from bandpass filter 28 is the chroma signal. The composite video signal output from line store 16 is then provided to the other input terminal of subtractor 34 and the chroma signal is subtracted from that to provide the luma signal. Hence the sum of the chroma signal at output terminal 32 and the luma signal at output terminal 36 is equal to the input composite video signal at terminal 12.

Figure 2:
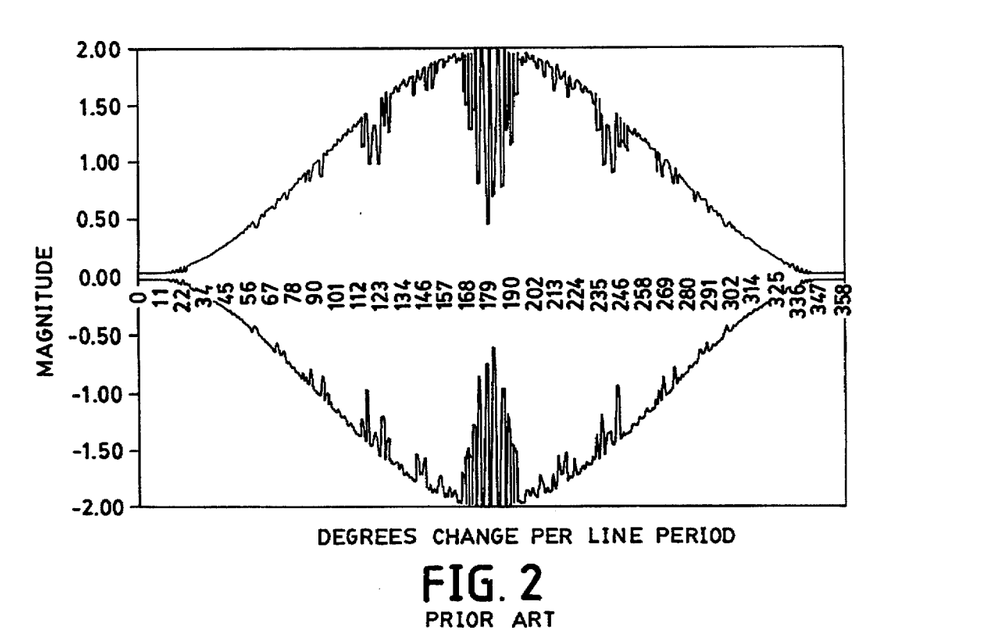
FIG. 2 shows the chroma vertical frequency characteristics of the filter of FIG. 1.

The vertical frequency characteristics of the chroma at output terminal 32 of the filter of FIG. 1 are shown in FIG. 2. As illustrated this filter has the inherent problem that the chroma output at terminal 32 has a gain of 2 shown by the vertical scale (magnitude) when the vertical information in the picture changes by 180° per line period. (The small numbers shown vertically along the horizontal scale of FIG. 2 are the phase degrees change per horizontal scan line period.) The resulting luma signal, when the chroma signal has a gain of 2, has the correct magnitude but undesirably is 180° out of phase and hence is referred to as an "illegal" signal both because of the incorrect chroma gain (magnitude) and the luma being out of phase.

Figure 3:
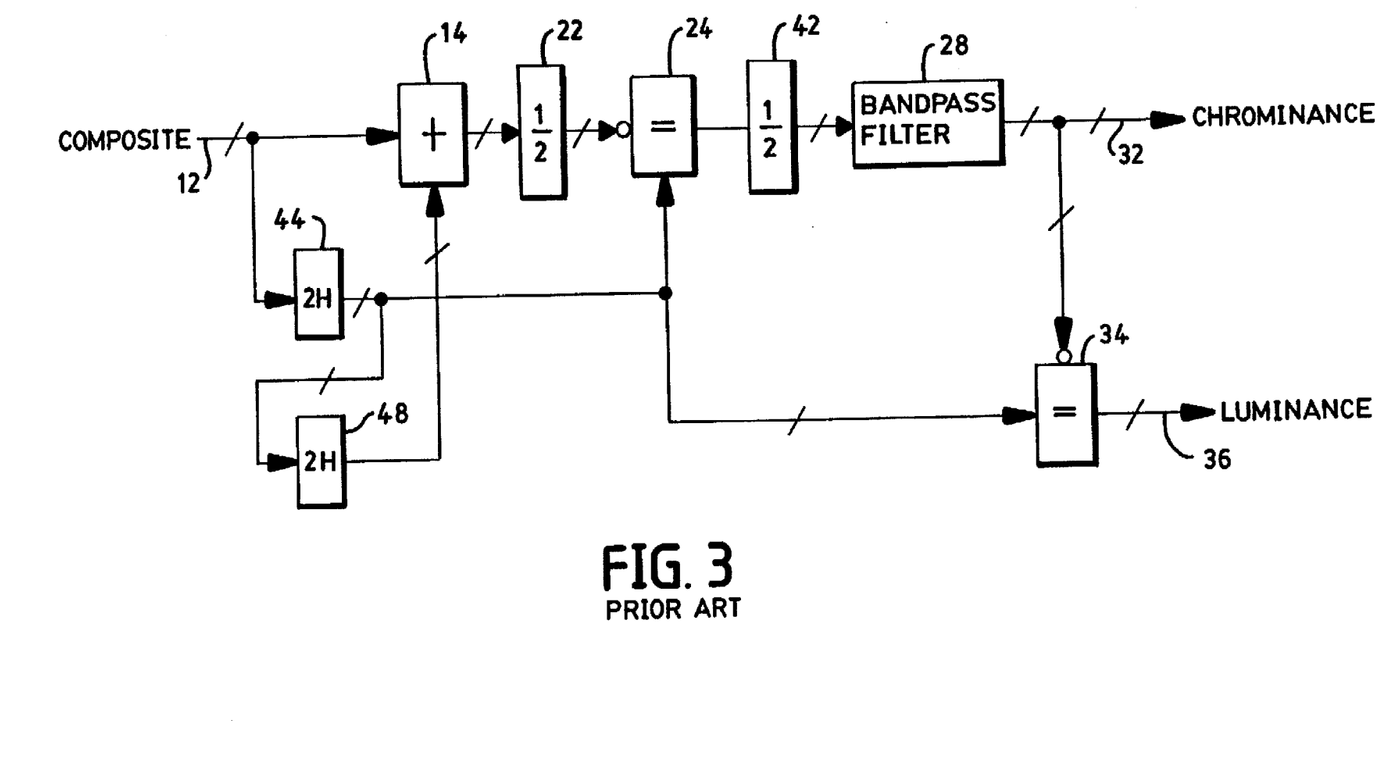
FIG. 3 shows a prior art four line comb filter.

FIG. 3 illustrates another comb filter block diagram, but having four scan lines of delay. Thus the structure of FIG. 3 has many of the elements of FIG. 1 except that, instead of single line stores 16 and 20, there are two-line stores 44 and 48. In this case the separation of the chroma and luma is achieved by averaging the composite video signal across the four line delay of line stores 44 and 48 in order to cancel the chroma, and subtracting the resultant luma signal from the center tap of the comb filter to provide the chroma signal. The chroma signal is filtered by bandpass filter 28 and subtracted from the center tap of the comb filter to provide the luma signal.

Figure 4:
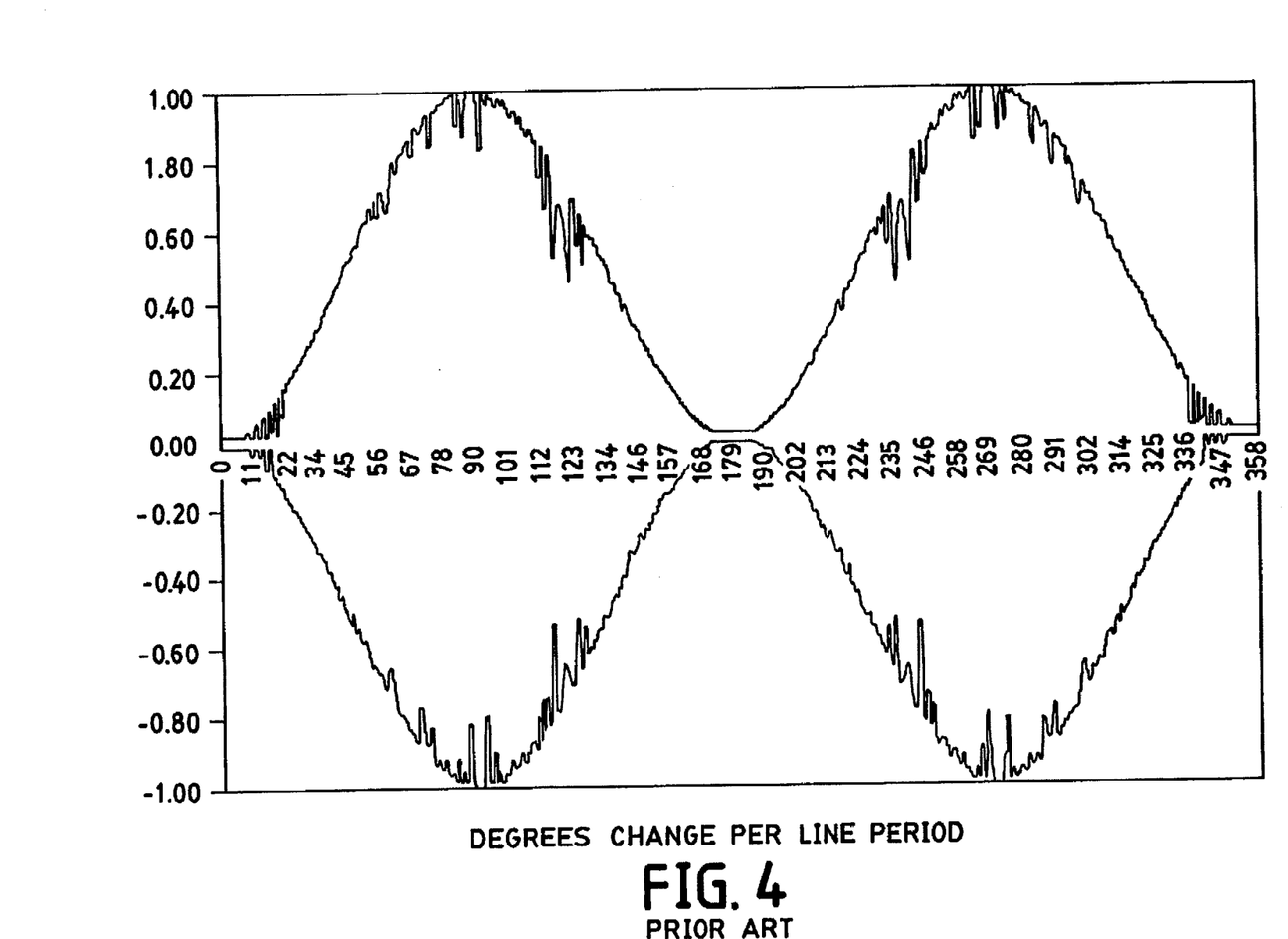
FIG. 4 shows the chroma vertical frequency characteristics of the filter of FIG. 3.

The vertical frequency characteristics of the comb filter of FIG. 3 as shown in FIG. 4 are free of the chroma gain error, i.e. the magnitude of chroma being 2.0 associated with the two line cosine comb filter of FIG. 1. However, undesirably the comb filter of FIG. 3 extends any failures in the comb filter across four horizontal scan lines and hence severely reduces the diagonal luminance resolution. Thus the filter of FIG. 3 provides better resolution than that of FIG. 1 and has a legalized output due to the maximum gain of unity. However, undesirably doubling the number of line stores increases cost and also causes any failures to be over four horizontal scan lines. That is to say, the wide aperture filter of FIG. 3 tends to smear diagonal picture information and undesirably to soften the picture vertically.

This reduction in diagonal luminance while not illustrated in FIG. 4 is shown in Table 1 in which a diagonal transition over 5 horizontal scan lines (designated lines OH to 4H) causes a wider spread of the transition and also larger and a larger numerical difference between the output terminal and the center tap (2H) of the comb filter. The values in Table 1 represent luminance on a scale of 16 to 235.

TABLE 1

| | | | | | | | | | |
|---|---|---|---|---|---|---|---|---|---|
| 4H | 16 | 16 | 32 | 128 | 219 | 235 | 235 | 235 | 235 | 235 |
| 3H | 16 | 16 | 16 | 32 | 128 | 219 | 235 | 235 | 235 | 235 |
| 2H | 16 | 16 | 16 | 16 | 32 | 128 | 235 | 235 | 235 | 235 |
| 1H | 16 | 16 | 16 | 16 | 16 | 32 | 128 | 219 | 235 | 235 |
| OH | 16 | 16 | 16 | 16 | 16 | 16 | 32 | 128 | 219 | 235 |
| 3 line | 16 | 16 | 16 | 20 | 52 | 127 | 200 | 231 | 235 | 235 |
| 5 line | 16 | 16 | 20 | 44 | 75 | 127 | 176 | 208 | 231 | 235 |

In Table 1, each entry in the row labelled "3 line" is the weighted sum for that column of (3H/4)+(2H/2)+(1H/4). Each entry in the row labelled "5 line" is the weighted sum for that column of (5H/4)+(2H2/2)+(OH/4); video lines 3H and 1H are ignored.

In the decoder described in Raby, each of the inputs to the comb filter is also passed through a simple decoder to provide a measure of the low frequency luminance and the magnitude and phase of the high frequency portion of the composite signal. This allows signals that would cause the output of the comb filter to be larger in magnitude than a simple decoder output, and which do not have a high frequency difference in phase between inputs to the comb filter which is consistent with the chrominance signal, to control the adaptation between different comb filters. Therefore this decoder has the drawbacks of the comb filter architecture of present FIG. 1 as described above.

Thus it would be desirable to have a comb filter which overcomes the above-described deficiencies in the prior art.

SUMMARY

In accordance with the present invention, an adaptive comb filter for NTSC or PAL television standards has only two horizontal scan lines of delay and effectively removes the high frequency luma. The magnitude and phase of the chroma signal from the comb filter are compared to the input signal to the comb filter which has been subject to a bandpass filtering process. Unless both the magnitude and phase of the comb filter chroma signal are equal to or less than that of the bandpass filtered signal, the comb filter chroma signal is assumed to be incorrect ("illegal") and a different comb filter is adaptively selected to legalize the chroma output signal.

Since abrupt transitions between different comb filters produce noticeable switching artifacts in areas of high frequency luminance, in both the PAL and NTSC present adaptive comb filters a cross fade transition between the comb filters is implemented, similar to that of Raby. This approach, coupled with comb fail detection also similar to that of Raby, produces an advantageous chroma vertical frequency characteristic. That is, the vertical frequency characteristics of the output chroma signal has a gain that never exceeds unity and subsequently does not invert the phase of the luma output signal. The output chroma signal is similar to that of a four line cosine comb filter of the type described above. However, since the present comb filter has only two lines of delay rather than four lines, any vertical cross luma is limited to only two horizontal scan lines and the diagonal luma resolution is thereby significantly improved.

Another improvement over the filter of Raby is that in Raby's NTSC comb filter when vertical discontinuities in the picture are detected, the three tap comb filter is adaptively switched to a two tap NTSC comb filter. However, the output of a two tap comb filter is referenced to the middle of the upper or lower two horizontal scan lines, instead of the middle of three scan lines as in the case of a three tap comb filter. Thus switching to a two tap comb filter from a three tap comb filter can cause undesirable vertical aliasing of pictures with vertical high frequency picture content. This problem is compounded if the comb filters selected produces a larger chroma signal than what a simple band split filter would produce, as this in turn causes the phase of a luma signal undesirably to change.

In accordance with the present invention, these problems are minimized in an NTSC comb filter by determining if the selected comb filter will or will not produce any increase in the chroma output relative to a simple bandpass filter. For example, in the case of a two tap filter, if subtracting the output from the first tap from that of the second tap causes the chroma output relative to a simple band split filter to increase, then instead subtracting the second tap output from the first tap output produces a "legal" result for NTSC television standard.

DETAILED DESCRIPTION

Figure 5:
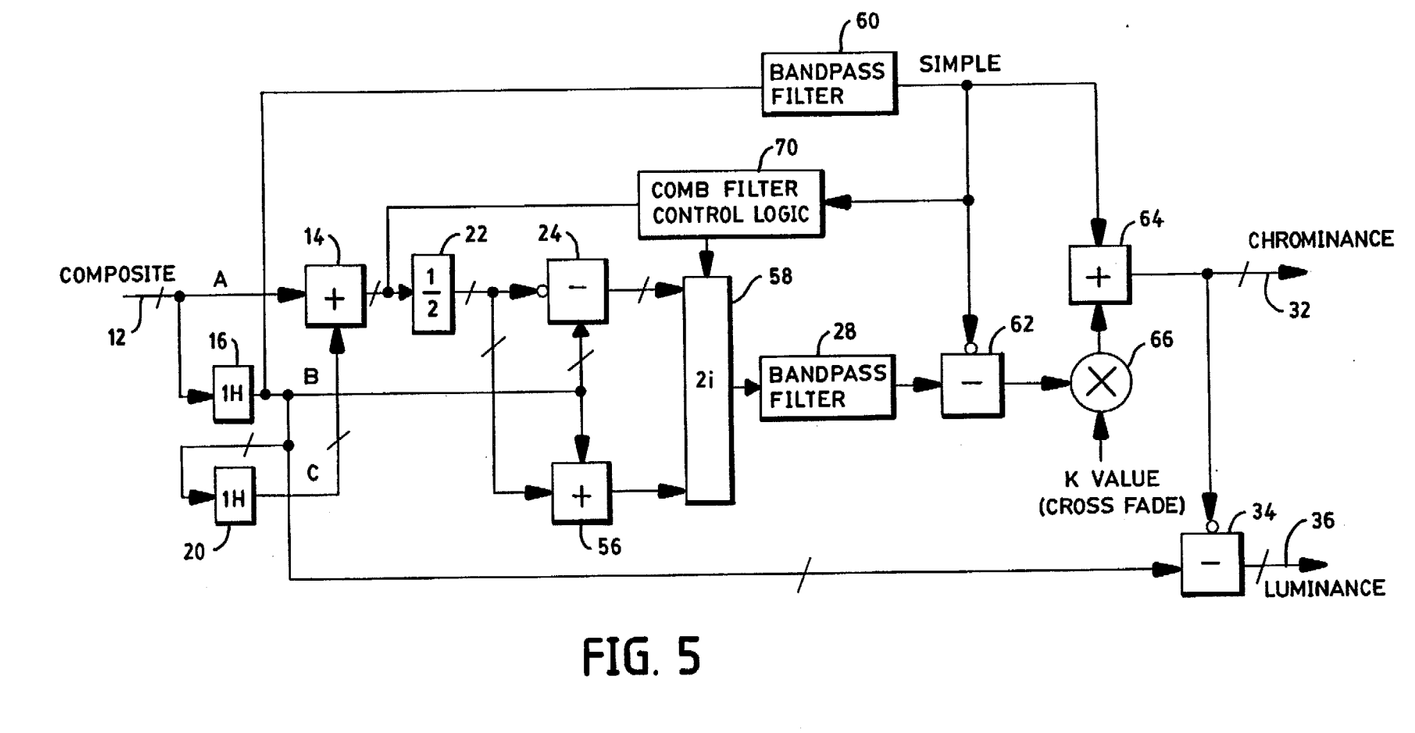
FIG. 5 shows a comb filter for PAL TV standard in accordance with the present invention.

FIG. 5 show a two line delay PAL TV standard comb filter in accordance with the present invention. Most of the elements shown in FIG. 5 are identical to those of FIG. 1. However the filter of FIG. 5 is an adaptive comb filter unlike that of FIG. 1 and therefore includes, in addition to the elements of FIG. 1, adder 56 and a comb filter selector 58. The output signal of subtractor 24, which in the structure of FIG. 1 is bandpass filtered to become the chroma output, instead here is a first input signal to comb filter selector 58. The output signal from subtractor 24 hence is the result of a first filter. Adder 56 sums the center tap signal (which is the output signal from single line store 16) with the output signal from the one-half multiplier 22 which averages the first and third lines, to provide the second filter.

Thus if vertically adjacent pixels from three consecutive horizontal scan lines are (as above) designated A, B, and C the output signal of subtractor 24 to comb filter selector 58 is C−(A+B)/2, while the output signal of adder 56 is (A+B)/2+C. The output signal from comb filter selector 58, which is one of the output signal of subtractor 24 or of the adder 56, is then filtered by bandpass filter 28.

The "simple" bandpass filtered composite video signal output by bandpass filter 60 is subtracted by subtractor 62 from the output signal from bandpass filter 28. Multiplier 66 multiplies the output signal from subtractor 62 by cross fade factor k, the resulting product being summed by adder 64 to provide the chroma at terminal 32. The luma signal, similar to FIG. 1, is the "center tap" signal output from line store 16, which is the composite video signal, from which is subtracted the chroma signal (chrominance) from terminal 32 to provide the luma signal (luminance) at output terminal 36.

Figure 6:
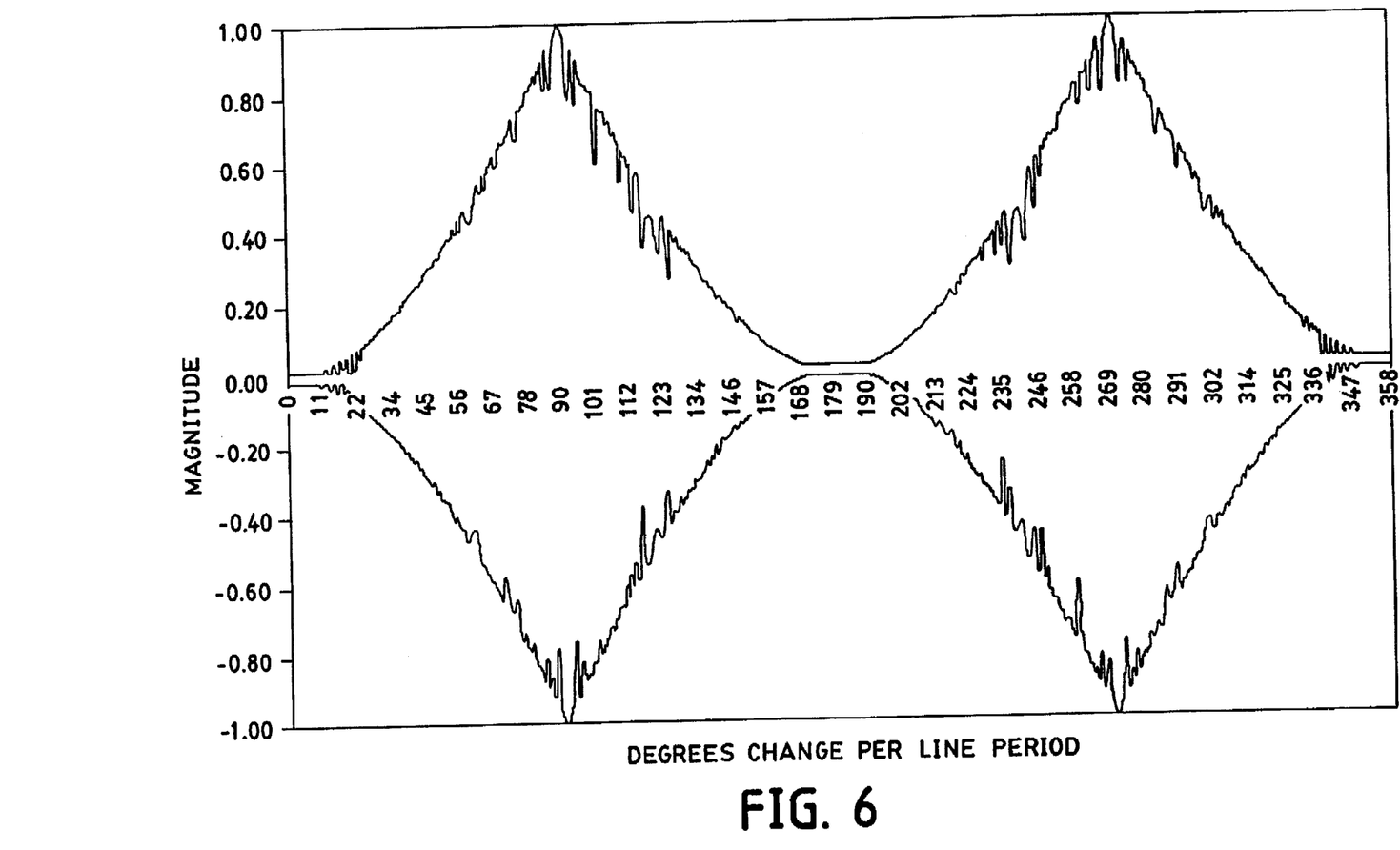
FIG. 6 shows the chroma vertical frequency characteristics of the filter of FIG. 5.

FIG. 6 shows chroma vertical frequency characteristics plotted as a signal magnitude (vertical scale) versus the degrees of phase change per horizontal scan line (horizontal scale) for the filter of FIG. 5. FIG. 6 illustrates that the gain of the chroma signal at output terminal 32 of the filter of FIG. 5 never exceeds unity and subsequently does not invert the phase of the luma signal output on terminal 36. The chroma output characteristic from the filter of FIG. 5 is similar to that of the prior art filter of FIG. 3. However because the filter of FIG. 5 only uses two lines of delay, rather than four lines, any vertical cross luminance occurs across only two horizontal scan lines and the diagonal luminance resolution is improved significantly.

The comb filter control selector 58 therefore is e.g. a [2:1] multiplexer adaptively choosing between the output signals from subtractor 24 and adder 56 to be the output signal to bandpass filter 28 to be the chroma. The comb filter selector 58 is controlled by comb filter control logic 70 which compares the magnitude and phase of the output signal from adder 14 with the phase and magnitude of the simple signal output by bandpass filter 60. This comparison selects (C−((A+B)/2)) (output of subtractor 24) or (C+((A+B)/2)) (output of adder 56) depending upon which will ensure that the comb filter output signal phase and magnitude is equal to or less than the simple bandpass signal.

Comb filter control logic 70 is similar to that disclosed in Raby at FIGS. 2A, 2B. In addition, a comprehensive set of error signals based upon the difference in high frequency component magnitude and phase, and the low frequency magnitude between the outer two horizontal scan lines is used to produce a complementary cross fade between the bandpassed output of the comb filter and the simple bandpass signal by determining a value of (also as in Raby).

The complementary cross fade between the simple and the comb is achieved here using a single multiplier 66, whose gain is controlled by the factor k as follows:
chrominance=k*(comb−simple)+simple which is equivalent to
chrominance=[k*comb]+[(1−k)*simple], where "simple" refers to the signal output by bandpass filter 60 and "comb" refers to the output signal of bandpass filter 28.

Figure 7A:
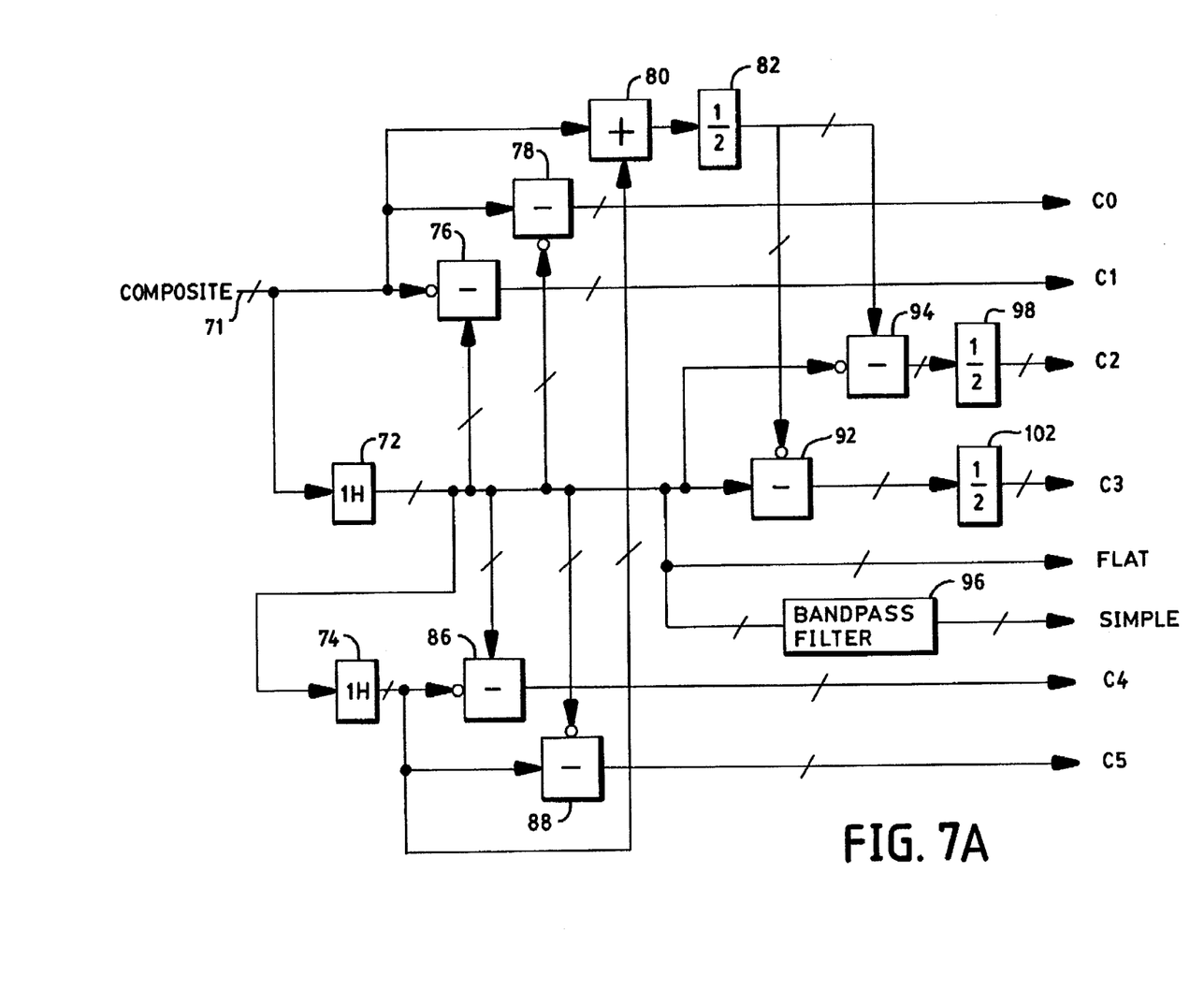
FIGS. 7A, 7B show a comb filter for NTSC TV standard in accordance with the present invention.
Figure 7B:
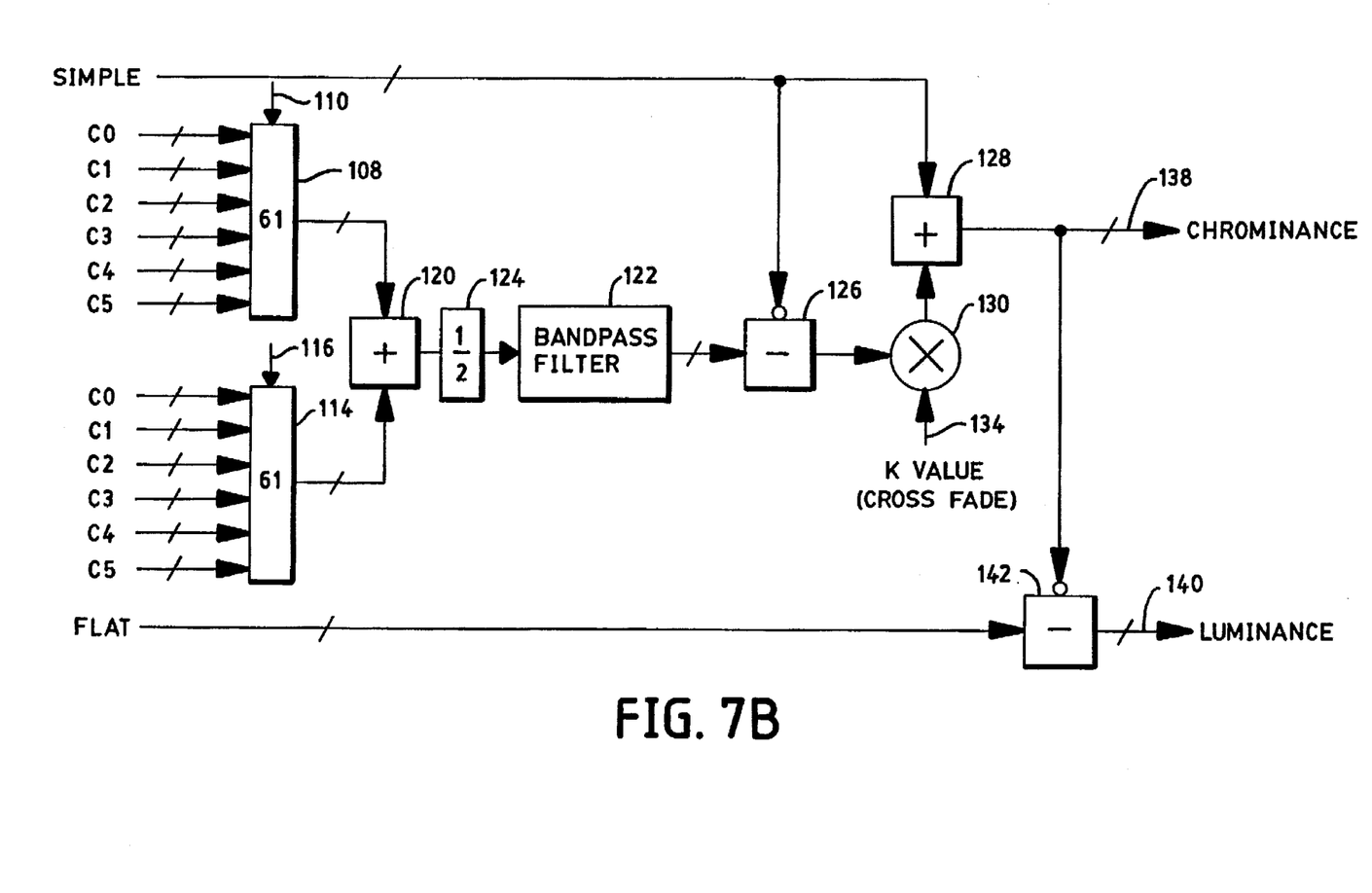

FIGS. 7A and 7B show an NTSC TV standard adaptive comb filter in accordance with the invention which implements one of six different comb filter architectures on a pixel by pixel basis. The magnitude and phase of the high frequency portion of each of the comb filter input signals (i.e. the composite video iput, and the two output signals of the two line stores), and the low frequency portion of these comb filter inputs are compared to determine which comb filter to implement. The first stage of the selection process selects one of three sets of comb filters, where signals C2 and C3 represent a three tap comb filter, signals C0 and C1 represent a lower two tap comb filter, and signals C4 and C5 represent the upper two tap comb filter. The second stage of the selection process determines which signal of the comb filter pair selected by the first stage would generate a comb filter output greater in magnitude or of a different phase from that of the simple bandpass filter output, as described further below.

In FIGS. 7A and 7B the input signal is the composite video applied to input terminal 71 (which is e.g. an 8 to 12 bit bus in a digital implementation). Input signal terminal 71 is coupled to a first one line store 72, the output terminal of which is connected to the input terminal of a second one line store 74. The input composite video is also connected to one input terminal of subtractor 76, the other input terminal of which is connected to the output terminal of delay element 72. The composite video is also applied to one input terminal of a second subtractor 78, the other input terminal of which is connected to the output terminal of a second one line store 72.

In the upper part of the figure, the composite video is also connected to a first input terminal of an adder 80, the second input terminal of which is connected to the output terminal of the line store 74. The sum of composite video and the delay composite video from delay element 74 are averaged by ½ multiplier element 82 and the output terminal of multiplier 82 is connected to input terminals of subtractor 94 and subtractor 92.

The output terminal of subtractor 94, which carries a difference between one line delayed composite video from line 72 and the averaged composite video from subtractor 82, is connected to ½ multiplier 98, the output of which is designated signal C2.

Signal C0 is the output signal from the subtractor 78, and signal C1 is the output signal from subtractor 76. The "flat" signal is the output signal from the first line store 72 and the "simple" signal is the output signal from line store 72 subject to a band pass filter 96. Thus the flat signal is the composite video and the simple signal is the composite video subject only to bandpass filtering. Signal C3 is one-half of the difference between the flat signal and the output signal from multiplier 82.

Signal C4 is the difference computed by subtractor 88 between the one line delayed composite video and the two line delayed composite video. Signal C5 is the difference computed by subtractor 88 between the two line delayed composite video and the one line delayed composite video, i.e. the negative of signal C4. The reason that C4 is equal to the negative of C5 is to ensure that the phase of the chrominance signal on the "comb" side of the cross fade is similar to the phase of the "simple" side of the cross fade. This ensures that one does not cross fade between signals that are 180° apart, since otherwise at the 50—50 point they would cancel each other out.

Signals C0 through C5, flat and simple as shown in FIG. 7B are the input signals to the two [6:1] multiplexers 108 and 114. Multiplexers 108, 114 are controlled respectively by control signals on their terminals 110 and 116. Thus each multiplexer 108 and 114 selects at any given time one of the signals C0 through C5 as its output signal as described above and further below. Adder 120 then adds the output signal from multiplexer 108 to the output signal from multiplexer 114 and the sum (after being multiplied by ½ by multiplier 124) is subject to filtering by bandpass filter 122. The bandpass filtered signal is then input to subtractor 126 and subtracted from the simple signal by subtractor 126, the output signal of which is connected to multiplier 130.

A cross fade k value similar to that described above in conjunction with FIG. 5 is the other input signal to multiplier 130. The output signal (product) of multiplier 130 is added to the simple signal by adder 128, the sum output from which is the chrominance signal at terminal 138.

The luminance signal at terminal 140 is the flat signal from which is subtracted the chrominance signal by subtractor 142.

Transitions between these different comb filters can cause vertical aliasing in pictures that contain both high frequency horizontal, spatial, and temporal changes in the picture content. An example would be a moving zone plate test pattern. To reduce this undesirable artifact, two independent comb filter architectures are selected by the two [6:1] multiplexers 108, 114. The first multiplexer 108 selects the previous pixel comb filter configuration and the second multiplexer 114 selects the present pixel comb filter configuration, on a pixel by pixel basis. Therefore when there is a change in the comb filter architecture, the first pixel of the comb filter change will be the average of the previous and present comb filter architectures, as shown in Table 2.

TABLE 2

| Comb Filter Architecture | Pixel count (n+) | | | | | |
|---|---|---|---|---|---|---|
| | 0 | 1 | 2 | 3 | 4 | 5 |
| C0 | $C0_0$ | $C0_1$ | $C0_2$ | $C0_3$ | $C0_4$ | $C0_5$ |
| C1 | $C1_0$ | $C1_1$ | $C1_2$ | $C1_3$ | $C1_4$ | $C1_5$ |
| C2 | $C2_0$ | $C2_1$ | $C2_2$ | $C2_3$ | $C2_4$ | $C2_5$ |
| C3 | $C3_0$ | $C3_1$ | $C3_2$ | $C3_3$ | $C3_4$ | $C3_6$ |
| C4 | $C4_0$ | $C4_1$ | $C4_2$ | $C4_3$ | $C4_4$ | $C4_5$ |
| C5 | $C5_0$ | $C5_1$ | $C5_2$ | $C5_3$ | $C5_4$ | $C5_6$ |
| Adaptive comb filter selection | C1 | C1 | C4 | C4 | C4 | C5 |
| Comb o/p | $C1_0 + C1_0$ | $C1_1 + C1_1$ | $C1_2 + C4_2$ | $C4_3 + C4_3$ | $C4_4 + C4_4$ | $C4_5 + C5_5$ |

Table 2 thereby describes the functioning of the comb filter control logic which controls each of multiplexers 108 and 114, i.e. provides the control signals on lines 110 and 116. The first line in Table 2 shows the pixel count, in this case pixels arbitrarily numbered 0 through 5 in sequence. The leftmost column shows the particular comb filter signals designated here as in FIGS. 7A and 7B. The subscripts in the entries in Table 2 indicate the time, i.e. subscripts 0 to 5 refer to pixels 0 to 5.

The last row of Table 2 shows the comb filter output for each pixel in terms of the signals C0 to C5 which are the signals input to adder 120 from multiplexer 108, 114. Thus for instance for pixel number 2, the comb filter output is the sum of signals C1 and C4.

Control logic (not shown but connected similarly to logic 70 in FIG. 5) provides the signals on lines 110 and 116 and is in the form of e.g. a set of logic gates or software embodying logic to carry out the functionality shown in Table 2 and is easily be constructed by one of ordinary skill in the art in light of this disclosure. This control logic uses the set of error signals resulting from a comparison of the magnitude and phase of the input video signal with the phase and magnitude of the simple signal as described above for FIG. 5 and as in Raby '784, and also uses the low frequency portion of the input video signal to provide an idea of the luma content of the picture for adaptive filtering.

Advantageously with both the comb filter structures of FIGS. 5 and 7A, 7B, the sum of the output chroma signal and the output luma signal is equal to the input composite video signal. Thus no information content of the video signal is lost; all picture content is present (e.g. in FIG. 5) either on output terminal 32 or output terminal 36. It is thus to be understood that under certain picture conditions the output signals may not be the pure chroma or luma signals but there may be some cross chroma/luma present in the output signals in the filters of both FIGS. 5 and 7A, 7B. However, because of the complementary nature of the comb filter architecture, any subsequent encoding of these decoded signals would produce a composite video virtually identical to the input to the comb filter decoder, any differences being introduced by the demodulation of the chrominance signal and the filtering of the color difference signal.

Various components of the filter structures of FIGS. 5 and FIGS. 7A, 7B may be arranged differently in various embodiments, and other equivalent components may be substituted for those depicted, and still be within the scope of the invention. Moreover, while this description is couched in terms of digital logic (hardware or circuitry), a software version of these filters may be implemented in a general purpose or special purpose processor of the type well-known in the art, wherein the software is a computer program (code) that configures circuits in the e.g. microprocessor, such as an Intel Pentium processor operating e.g. at 160 MHz, to carry out the filter functions. Thus the present digital filter may be implemented in circuitry or in a software version, and one of ordinary skill in the art would be able to code such a computer program for carrying out the functions of this digital filter in light of this disclosure.

This disclosure is illustrative and not limiting; further modifications will be apparent to one of ordinary skill in the art in light of this disclosure and are intended to fall within the scope of the appended claims.

What is claimed:

1. A method of decoding a composite video input signal into chroma and luma information, comprising the steps of:
    applying the composite video input signal to at least a first and a second filter;
    determining if a chroma output signal from one of the at least two filters has both phase and a magnitude within particular limits;
    if both the phase and magnitude are within the particular limits, selecting the output signal from the one of said at least two filters; and
    otherwise, selecting a chroma output signal from the other of said at least two filters.

2. The method of claim 1, wherein the particular limits are respectively a phase and magnitude of the composite video input signal which has been subject to bandpass filtering.

3. The method of claim 1, further comprising the step of cross fading between the selected outputs and the composite video input signal which has been bandpass filtered.

4. The method of claim 1, further comprising the step of providing additional third, fourth, fifth, and sixth filters, and wherein the step of selecting includes adaptively selecting a chroma output signal from one of the second through sixth filters.

5. The method of claim 1, wherein the step of determining also includes determining a level of the luma content of the composite video input signal.

6. The method of claim 1, wherein the composite video input signal is one of a PAL-TV signal and an NTSC-TV signal.

7. The method of claim 1, wherein the step of selecting operates on no more than three horizontal scan lines of the composite video input signal at any one time.

8. A decoder for separating chroma and luma information from a composite video signal, comprising:
    a decoder input terminal for receiving the composite video signal;
    at least first and second filters each having an input terminal coupled to the decoder input terminal and each having an output terminal coupled to a selector; and
    the selector having an output terminal for providing the chroma information as separated from the composite video signal from one of the first and second filters, wherein the selector selects an output signal from the first filter if both a phase and magnitude of the output signal from the first filter are within particular limits, otherwise selecting the output signal of the second filter.

9. The decoder of claim 8, the selector including control logic for comparing the phase and magnitude of the output signal to the particular limits, the particular limits being respectively a phase and magnitude of the composite video signal which has been subject to bandpass filtering.

10. The decoder of claim 8, further comprising a cross fader connected to crossfade between an output from the selector and the composite video signal which has been bandpass filtered.

11. The decoder of claim 8, further comprising:
    third, fourth, fifth and sixth filters each having an input terminal coupled to the decoder input terminal and each having an output terminal coupled to the selector; and
    the selector otherwise selecting the output of one of the second, third, fourth, fifth and sixth filters.

12. A decoder for separating chroma and luma information from a composite video signal, comprising:
    a decoder input terminal for receiving the composite video signal;
    first and second filters each having an input terminal coupled to the decoder input terminal and having an output terminal coupled to a selector;
    the selector having an output terminal for providing the chroma information as separated from the composite video signal from one of the first and second filters;
    a subtractor having first and second input terminals coupled respectively to the output terminal of the selector and to the decoder input terminal, and having an output terminal for providing the luma information, whereby a sum of the luma information and the chroma information is equal to the composite video signal; and
    a cross fader for transitioning between an output of the selector and the composite video signal which has been bandpass filtered.

13. The decoder of claim 12, further comprising a vertical transition detector having an input terminal coupled to the decoder input terminal and having an output terminal coupled to a control terminal of the selector, wherein the detector switches the selector in accordance with detected transitions of the composite video signal between horizontal scan lines of the composite video signal.

14. The decoder of claim 12, wherein each of the first and second filters simultaneously processes portions of three horizontal scan lines of the composite video signal.

15. The decoder of claim 14, wherein the first filter includes at least first and second line stores coupled in series to the decoder input terminal and an averager coupled to an output terminal of the second line store and to the decoder input terminal, and a subtractor having two input terminals coupled respectively to an output terminal of the first line store and to an output terminal of the averager.

16. The decoder of claim 15, wherein the second filter includes an adder having two input terminals coupled respectively to the output terminal of the averager and to an output terminal of the first line store.

17. The decoder of claim 12, further comprising a bandpass filter coupled between the output terminal of the selector and the first input terminal of the subtractor.

18. The decoder of claim 12, there being no bandpass, high pass, or low pass filter coupled between the decoder input terminal and the selector.

19. The decoder of claim 12, wherein the composite video signal is one of a PAL-TV signal and an NTSC-TV signal.

20. The decoder of claim 12, wherein the first and second filters each operate on no more than three horizontal scan lines of the video signal simultaneously.

21. A decoder for separating chroma and luma information from a composite video signal, comprising:

a decoder input terminal for receiving the composite video signal;

first and second filters each having an input terminal coupled to the decoder input terminal and having an output terminal coupled to a selector;

the selector having an output terminal for providing the chroma information as separated from the composite video signal from one of the first and second filters; and a subtractor having first and second input terminals coupled respectively to the output terminal of the selector and to the decoder input terminal, and having an output terminal for providing the luma information, whereby a sum of the luma information and the chroma information is equal to the composite video signal;

wherein each of the first and second filters simultaneously processes portions of three horizontal scan lines of the composite video signal; and wherein the first filter includes at least first and second line stores coupled in series to the decoder input terminal and an averager coupled to an output terminal of the second line store and to the decoder input terminal, and a subtractor having two input terminals coupled respectively to an output terminal of the first line store and to an output terminal of the averager.

22. A decoder for separating chroma and luma information from a composite video signal, comprising:

a decoder input terminal for receiving the composite video signal;

first through sixth filters each having an input terminal coupled to the decoder input terminal and each having an output terminal, each output terminal being coupled to a first selector and to a second selector;

each of the first and second selectors having an output terminal coupled to an adder for providing the chroma information separated from the composite video signal;

wherein the first through sixth filters respectively are (1) a lower two tap comb filter;
(2) a lower two tap comb filter;
(3) a three tap comb filter;
(4) a three tap comb filter;
(5) an upper two tap comb filter; and
(6) an upper two tap comb filter.

* * * * *